(12) United States Patent
Shimada et al.

(10) Patent No.: US 7,673,589 B2
(45) Date of Patent: Mar. 9, 2010

(54) ENGINE-DRIVEN WORK MACHINE

(75) Inventors: Yuji Shimada, Saitama (JP); Hiromi Kakoo, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 701 days.

(21) Appl. No.: 10/570,955

(22) PCT Filed: Sep. 9, 2004

(86) PCT No.: PCT/JP2004/013102

§ 371 (c)(1),
(2), (4) Date: Feb. 7, 2007

(87) PCT Pub. No.: WO2005/026606

PCT Pub. Date: Mar. 24, 2005

(65) Prior Publication Data

US 2007/0205350 A1     Sep. 6, 2007

(30) Foreign Application Priority Data

Sep. 9, 2003     (JP) .............................. 2003-316492

(51) Int. Cl.
    *F02B 63/00*     (2006.01)
(52) U.S. Cl. ........................... 123/2; 248/652; 290/1 A
(58) Field of Classification Search ..................... 123/2; 290/1 A; 248/652

See application file for complete search history.

(56) References Cited

U.S. PATENT DOCUMENTS

| | | | | |
|---|---|---|---|---|
| 1,913,935 A | * | 6/1933 | Lee | 180/300 |
| 3,762,671 A | * | 10/1973 | Schulz | 267/140.2 |
| 6,758,169 B2 | * | 7/2004 | Suzuki et al. | 290/1 A |

FOREIGN PATENT DOCUMENTS

| | | |
|---|---|---|
| JP | 56-18215 | 2/1981 |
| JP | 61-16130 A | 1/1986 |
| JP | 63-189918 U | 12/1988 |
| JP | 5-83501 U | 11/1993 |

\* cited by examiner

*Primary Examiner*—Noah Kamen
(74) *Attorney, Agent, or Firm*—Arent Fox LLP

(57) ABSTRACT

An engine-driven work machine is provided in which elastic support members (11, 11) are disposed between a lower part of a work unit (U) having an engine (3) and a frame (2) having the work unit (U) mounted thereon, the elastic support members (11, 11) being disposed beneath a crankshaft (17) of the engine on either side of a vertical plane (V) passing through the axis of the crankshaft (17), and restricting means (122) is provided between the work unit (U) and the frame (2), the restricting means (122) restricting the amplitude of swing of the work unit (U) around the crankshaft (17) to within a predetermined angle, and the restricting means (122) being disposed between upper parts of the work unit (U) and the frame (2). Even when the work unit receives a large external force in the lateral direction, swing of the work unit can thereby be restricted to within the predetermined angle.

6 Claims, 16 Drawing Sheets

ENGINE-DRIVEN WORK MACHINE

CROSS-REFERENCE TO RELATED APPLICATION

This application is a National Stage entry of International Application No. PCT/JP2004/013102, filed Sep. 9, 2004, the entire specification claims and drawings of which are incorporated herewith by reference.

TECHNICAL FIELD

The present invention relates to an improvement of an engine-driven work machine in which a work unit is formed by joining an engine and a work machine driven by a crankshaft of the engine, elastic support members are disposed between a lower part of the work unit and a frame having the work unit mounted thereon, the elastic support members being disposed beneath the crankshaft on either side of a vertical plane passing through the axis of the crankshaft, support faces of opposite elastic support members facing the frame and the work unit are inclined so as to widen from each other in going upward, and restricting means is provided between the work unit and the frame, the restricting means restricting the amplitude of swing of the work unit around the crankshaft to within a predetermined angle.

BACKGROUND ART

Such an engine-driven work machine is already known, as disclosed in, for example, Patent Publication 1. In such an engine-driven work machine, when the work unit is running, vibration around the crankshaft is absorbed effectively by deformation of the elastic support members, thus suppressing transmission of the vibration to the frame, and the amplitude of swing of the work unit is restricted to within a predetermined angle by the restricting means, thus assuring the durability of the elastic support members and avoiding interference between the work unit and the frame.

Patent Publication 1: Japanese Utility Model Registration Application Laid-open No. 5-83501

DISCLOSURE OF THE INVENTION

Problems to be Solved by the Invention

In the conventional arrangement, since the restricting means, together with the elastic support members, are concentrated in an area between lower parts of the work unit and the frame, when the restricting means restricts the amplitude of swing of the work unit, it receives a large load and, in particular, when a large work unit is mounted, high strength is required. Moreover, when the work unit receives a large external force from a lateral direction, there is a tendency for the upper part of the work unit to swing through a large angle with the restricting means in the lower part as the fulcrum; it is therefore necessary to take this into consideration and provide a large gap between upper parts of the work unit and the frame, and this is one of the factors causing an increase in the dimensions of the engine-driven work machine.

The present invention has been accomplished under the above-mentioned circumstances, and it is an object thereof to provide an engine-driven work machine in which the load that restricting means receives is relatively small, and the swing of a work unit can be restricted to within a small angle by this restricting means even when a large external force is applied in a lateral direction.

Means for Solving the Problems

In order to accomplish the above object, according to a first aspect of the present invention, there is provided an engine-driven work machine in which a work unit is formed by joining an engine and a work machine driven by a crankshaft of the engine, elastic support members are disposed between a lower part of the work unit and a frame having the work unit mounted thereon, the elastic support members being disposed beneath the crankshaft on either side of a vertical plane passing through the axis of the crankshaft, support faces of opposite elastic support members facing the frame and the work unit are inclined so as to widen from each other in going upward, and restricting means is provided between the work unit and the frame, the restricting means restricting the amplitude of swing of the work unit around the crankshaft to within a predetermined angle, characterized in that the restricting means is disposed between upper parts of the work unit and the frame as upper restricting means.

The engine-driven work machine corresponds to an engine-driven generator 1 of an embodiment of the present invention, which will be described later, and the work machine corresponds to a generator 4.

According to a second aspect of the present invention, in addition to the first aspect, the upper restricting means are disposed on either side of the vertical plane passing through the axis of the crankshaft above the crankshaft, and these upper restricting means are arranged so as to also restrict movement of the work unit along the axial direction of the crankshaft to within a predetermined distance.

According to a third aspect of the present invention, in addition to the second aspect, an exhaust box housing an exhaust muffler of the engine is fixedly provided on one end part of the work unit, and the upper restricting means are provided between opposite side parts of an upper part of the exhaust box and the frame.

According to a fourth aspect of the present invention, in addition to the third aspect, a duct member having a cooling air passage defined on the outer periphery of the work unit is fixedly provided on the work unit, and an intake box having an intake opening and fixed to the frame is connected to an upstream end part of the duct member via an elastic seal.

According to a fifth aspect of the present invention, in addition to any one of the first to fourth aspects, lower restricting means is provided between the work unit and the frame between the two elastic support members, the lower restricting means restricting movement of the work unit along the axial direction of the crankshaft to within a predetermined distance.

According to a sixth aspect of the present invention, in addition to either the second or third aspect, the two upper restricting means are formed from a rod-shaped first stopper member fixedly provided on one of the frame and the work unit and extending in the lateral direction of the work unit, and an inverted U-shaped second stopper member fixedly provided on the other of the frame and the work unit, the second stopper member facing an upper face and opposite side faces of the first stopper member across a predetermined gap.

According to a seventh aspect of the present invention, in addition to the fifth aspect, the lower restricting means is formed from a channel-shaped first stopper member fixedly provided on one of the frame and the work unit and extending in the lateral direction of the work unit, and a second stopper member fixedly provided on the other of the frame and the work unit, the second stopper member facing a roof and opposite inner side faces of the first stopper member across a predetermined gap, and a cushioning member being disposed between upper and lower opposing faces of the first and second stopper members.

The first and second stopper members of the lower restricting means correspond to an outer channel portion 15a and an inner channel portion 7a respectively of the embodiment of the present invention, which will be described later.

EFFECTS OF THE INVENTION

In accordance with the first aspect of the present invention, when the work unit receives a large external force in a lateral direction while the work unit is running or is being transported, even if the work unit attempts to swing through a large angle with the elastic support member on one side as the fulcrum, since the upper restricting means restricts the swing to within a small angle, it is possible to avoid interference between the work unit and the frame while preventing excessive deformation of the elastic support member. Moreover, since the upper restricting means is disposed above and sufficiently distant from the elastic support member on said one side, which functions as the swing fulcrum for the work unit, the load that the restricting means receives from the work unit and the frame is relatively small, thus improving the durability of the upper restricting means and enabling the size and weight to be reduced.

Moreover, since the upper restricting means, which is disposed between the upper parts of the work unit and the frame, directly restricts swinging of the upper part of the work unit, swinging of the upper part of the work unit, which swings particularly easily, is restricted accurately, thus enabling the gap between the upper parts of the work unit and the frame to be minimized and thereby contributing to making the engine-driven work machine compact.

Furthermore, in accordance with the second aspect of the present invention, since the upper restricting means are disposed on either side of the upper part of the work unit, it is possible for each of the upper restricting means to restrict the amplitude of swing of the work unit around the crankshaft with a smaller load. Moreover, even if the work unit receives a large external force in the axial direction of the crankshaft during transport, etc. of the engine-driven work machine, it is possible to restrict movement of the work unit in the axial direction of the crankshaft to within a predetermined distance by the upper restricting means, thus preventing interference between the work unit and the frame while reducing the impact load exerted on the elastic support member.

Moreover, in accordance with the third aspect of the present invention, since the two upper side parts of the exhaust box, on which the upper restricting means are provided, are sufficiently distant from the crankshaft in the work unit, it is possible to easily provide a sufficiently long distance between the upper restricting means and the crankshaft, thus easily decreasing the load that the restricting means receives from the work unit and the frame. Furthermore, since the two upper side parts of the exhaust box, on which the upper restricting means are provided, are relatively close to the frame, it is possible to easily arrange the upper restricting means in the proximity of the frame.

Furthermore, in accordance with the fourth aspect of the present invention, when the work unit swings or moves, since the swing or the movement of the work unit is resisted not only by the operation of the upper restricting means but also by the resilient force generated in the elastic seal between the duct member and the intake box, it is possible to fully withstand a large impact load.

Moreover, in accordance with the fifth aspect of the present invention, when the engine-driven work machine is transported, etc. if the work unit receives a large external force in the axial direction of the crankshaft, it is possible to suppress deformation of the elastic support member and movement of the work unit by the lower restricting means, thus preventing interference between the work unit and the frame while reducing the load exerted on the elastic support member.

Furthermore, in accordance with the sixth aspect of the present invention, it is possible to restrict the amplitude of swing around the crankshaft and the axial movement of the work unit by means of a simple structure.

Moreover, in accordance with the seventh aspect of the present invention, even if the work unit receives a downward external force, it is possible to suppress downward movement of the work unit to a low level while moderating the external force by utilizing the lower restricting means.

EXPLANATION OF REFERENCE NUMERALS AND SYMBOLS

Figure 1:
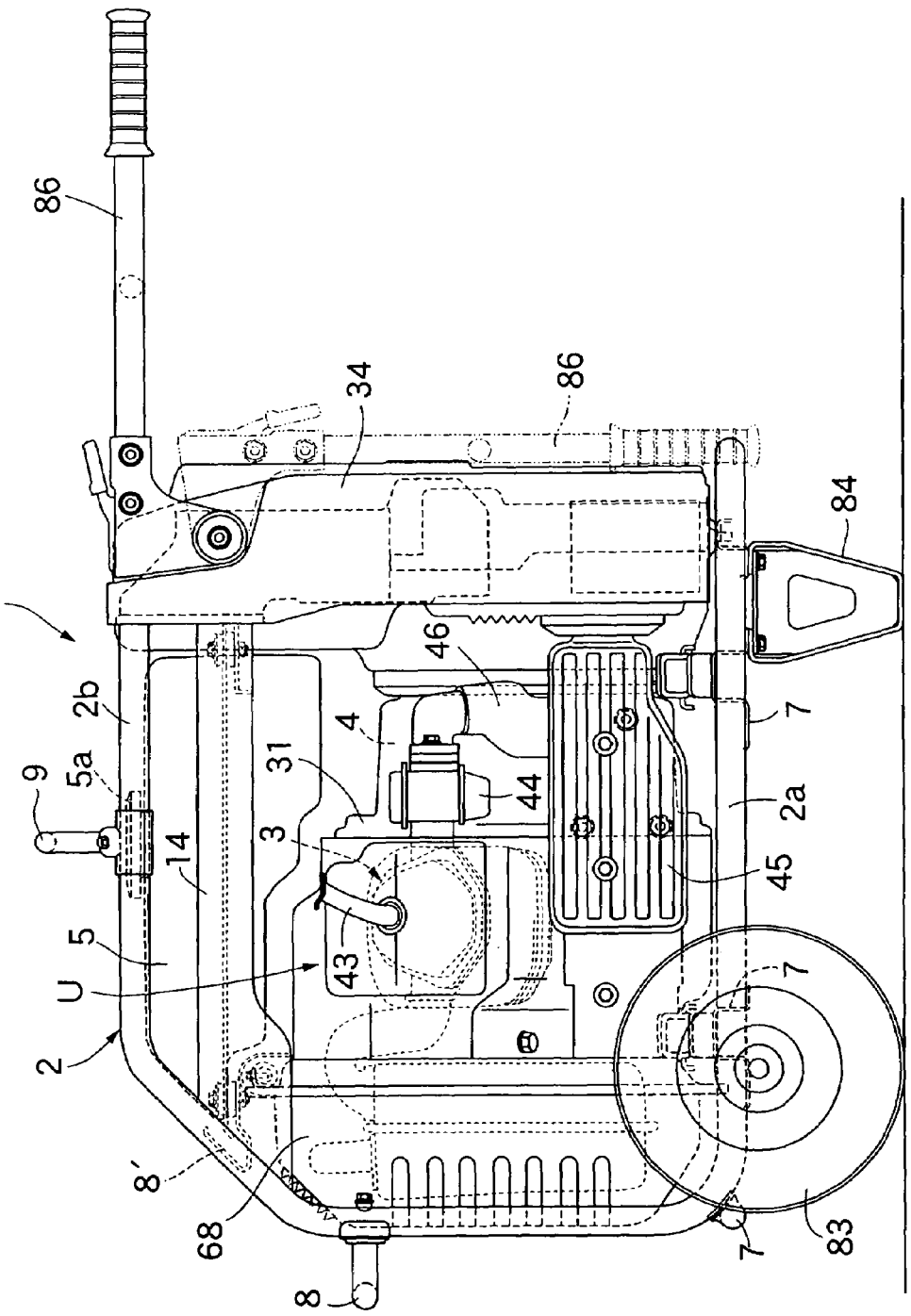
FIG. 1 is a side view of an engine-driven generator related to the present invention (Embodiment 1).

1 Engine-Driven Generator
3 Engine
4 Work Machine (Generator)
7a Second Stopper Member of Lower Restricting Means (Inner Channel Portion)
11 Elastic Support Member
15a First Stopper Member of Lower Restricting Means (Outer Channel Portion)
17 Crankshaft 31 Duct Member
32 Cooling Air Passage
34 Intake Box
38a Intake Opening (First Intake Louver)
38b Intake Opening (Second Intake Louver)
41 Seal
68 Exhaust Box
74 Exhaust Muffler
120 Lower Restricting Means
122 Upper Restricting Means
124 First Stopper Member of Upper Restricting Means
125 Second Stopper Member of Upper Restricting Means

BEST MODE FOR CARRYING OUT THE INVENTION

A mode for carrying out the present invention is explained below by reference to a preferred embodiment of the present invention shown in the drawings.

EMBODIMENT 1

Figure 2:
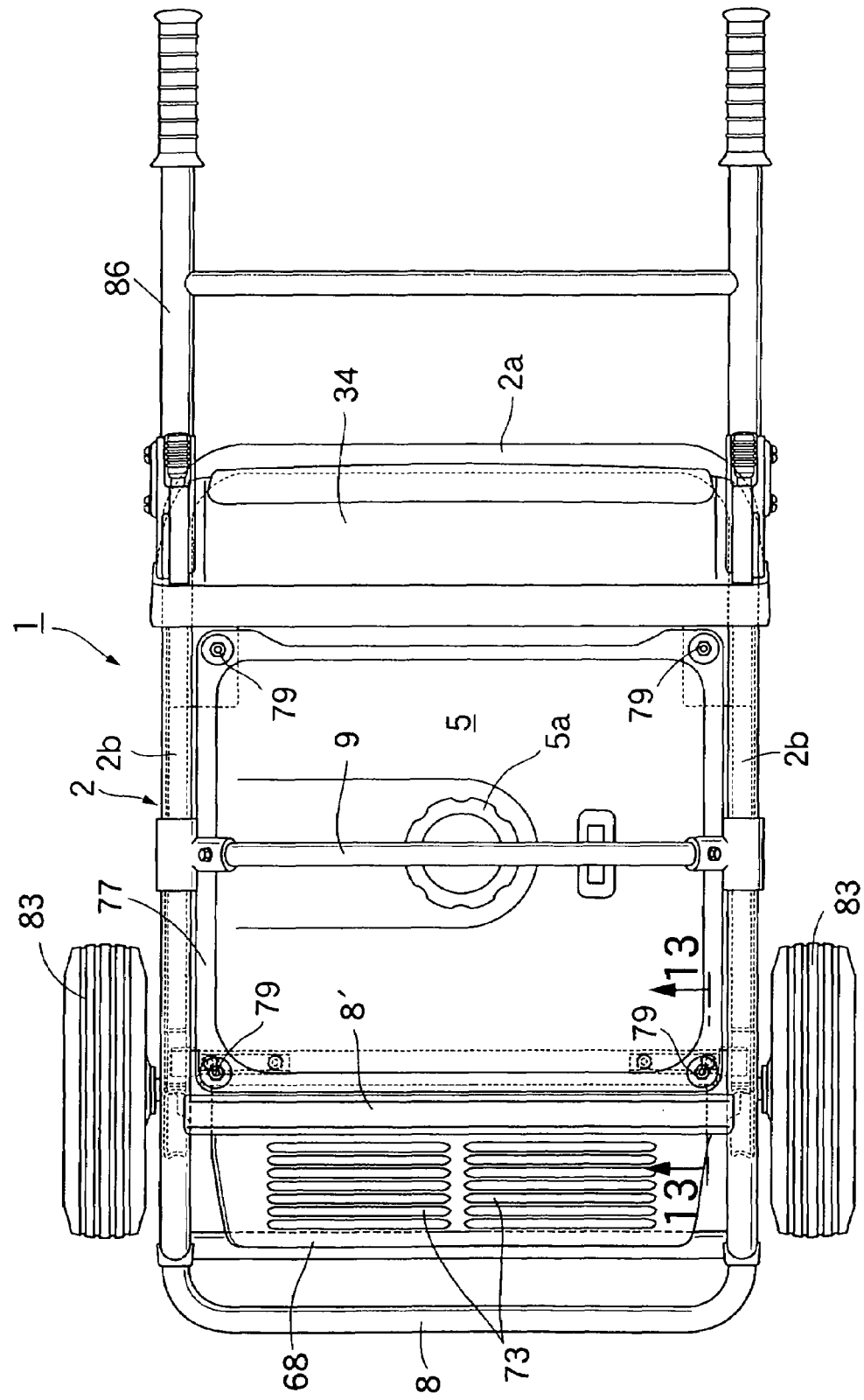
FIG. 2 is a plan view of the engine-driven generator (Embodiment 1).
Figure 3:
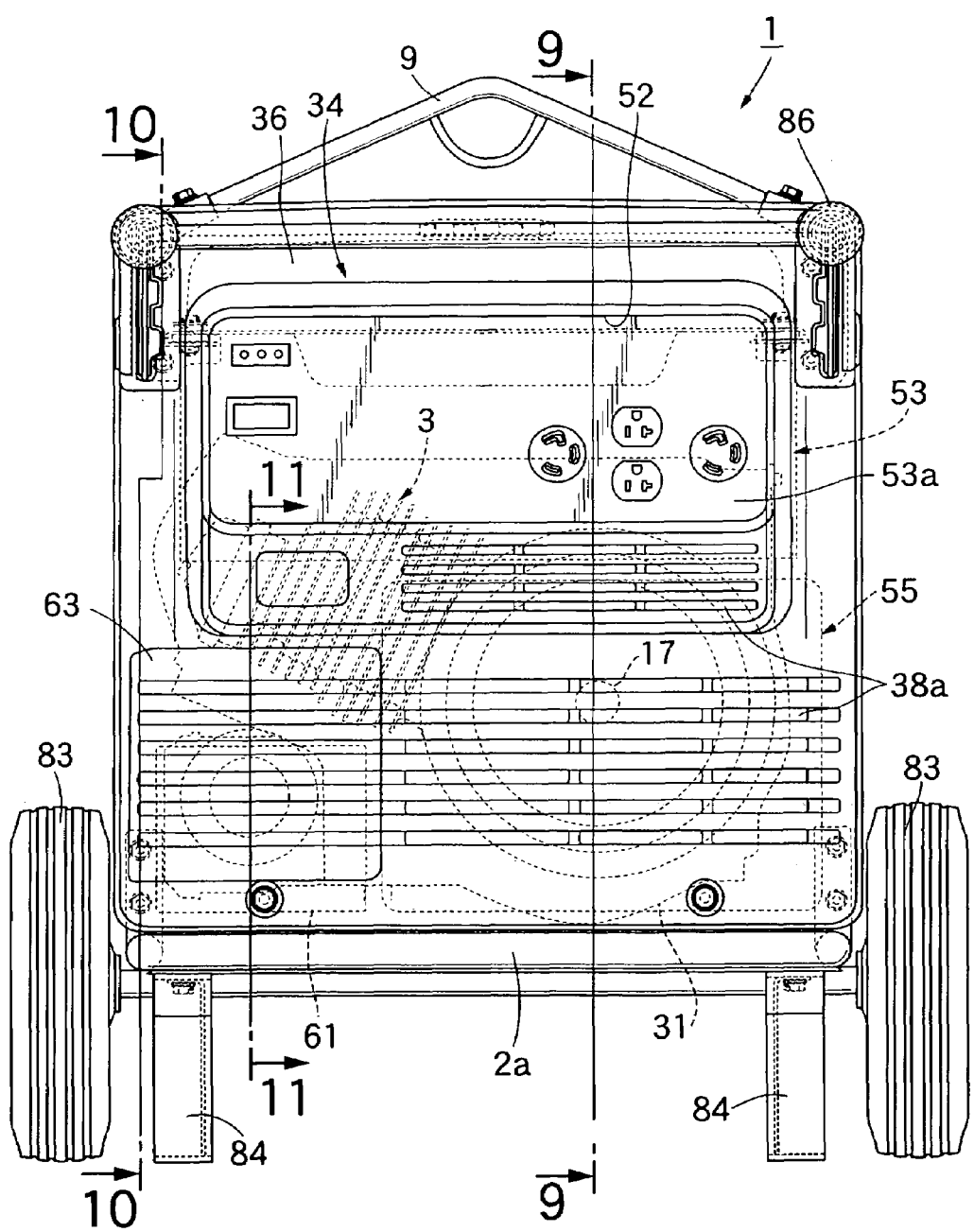
FIG. 3 is a front view of the engine-driven generator (Embodiment 1).
Figure 4:
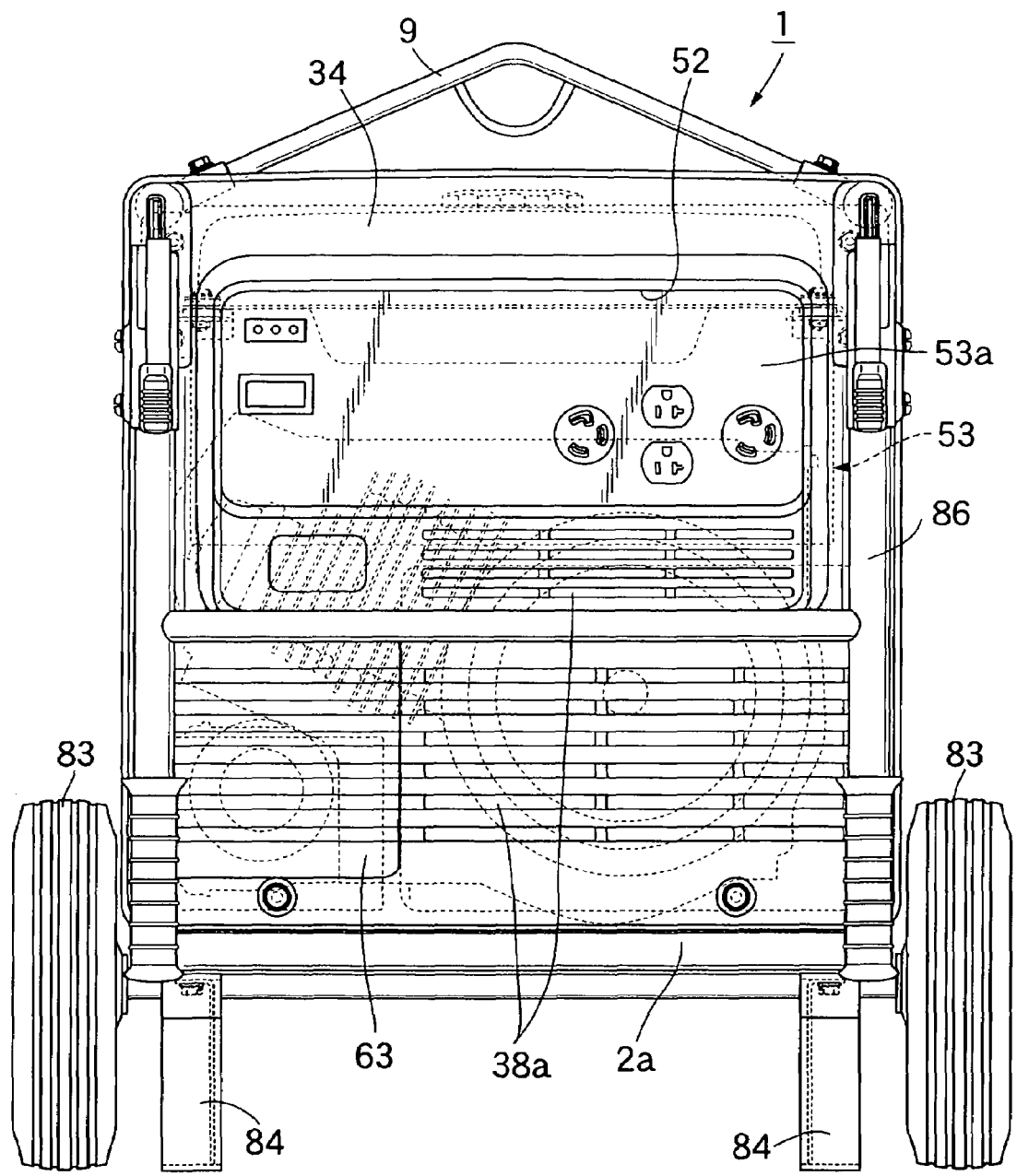
FIG. 4 is a front view of the engine-driven generator when a moving handle is in a stored state (Embodiment 1).

Referring firstly to FIG. 1 to FIG. 3, an engine-driven generator 1, as an engine-driven work machine of the present invention, includes a frame 2, a work unit U that is formed by joining an engine 3 and a generator 4 and is resiliently supported on the frame 2, a fuel tank 5 that is mounted on an upper part of the frame 2, and a control unit 53 for the engine 3 and the generator 4.

As shown in FIG. 1 to FIG. 3 and FIG. 8, the frame 2 is formed from a base frame 2a formed by bending a steel pipe into a U-shape, and left and right side frames 2b, 2b formed by bending steel pipes connected to opposite ends of the base frame 2a first upward and then horizontally, the side frames 2b, 2b forming, in cooperation with left and right side sections of the base frame 2a, a U-shape.

Provided on the base frame 2a are a plurality of lower cross members 7, 7 providing a connection between the left and right side sections, provided between upper parts of vertical side sections of the two side frames 2b, 2b is a middle cross member 8 providing a connection between the upper parts, and provided between inclined upper corners of the two side frames 2b, 2b is an upper cross member 8' providing a connection between the corners. This middle cross member 8 has a longitudinally middle section projecting outward relative to the two side frames 2b, 2b so as to function also as a bumper. Provided in upper side sections of the left and right side frames 2b, 2b is a hanger member 9 for providing a connection between middle parts of the upper side sections, the hanger member 9 being used for hanging and moving the engine-driven generator 1. In this way, the frame 2 is formed in the shape of a framework having an open periphery.

In the engine-driven generator 1, the side on which the U-shaped side frames 2b, 2b are open is defined as the front side, and the side on which the side frames 2b, 2b are closed, that is, the middle cross member 8 side, is defined as the rear side.

Figure 6:
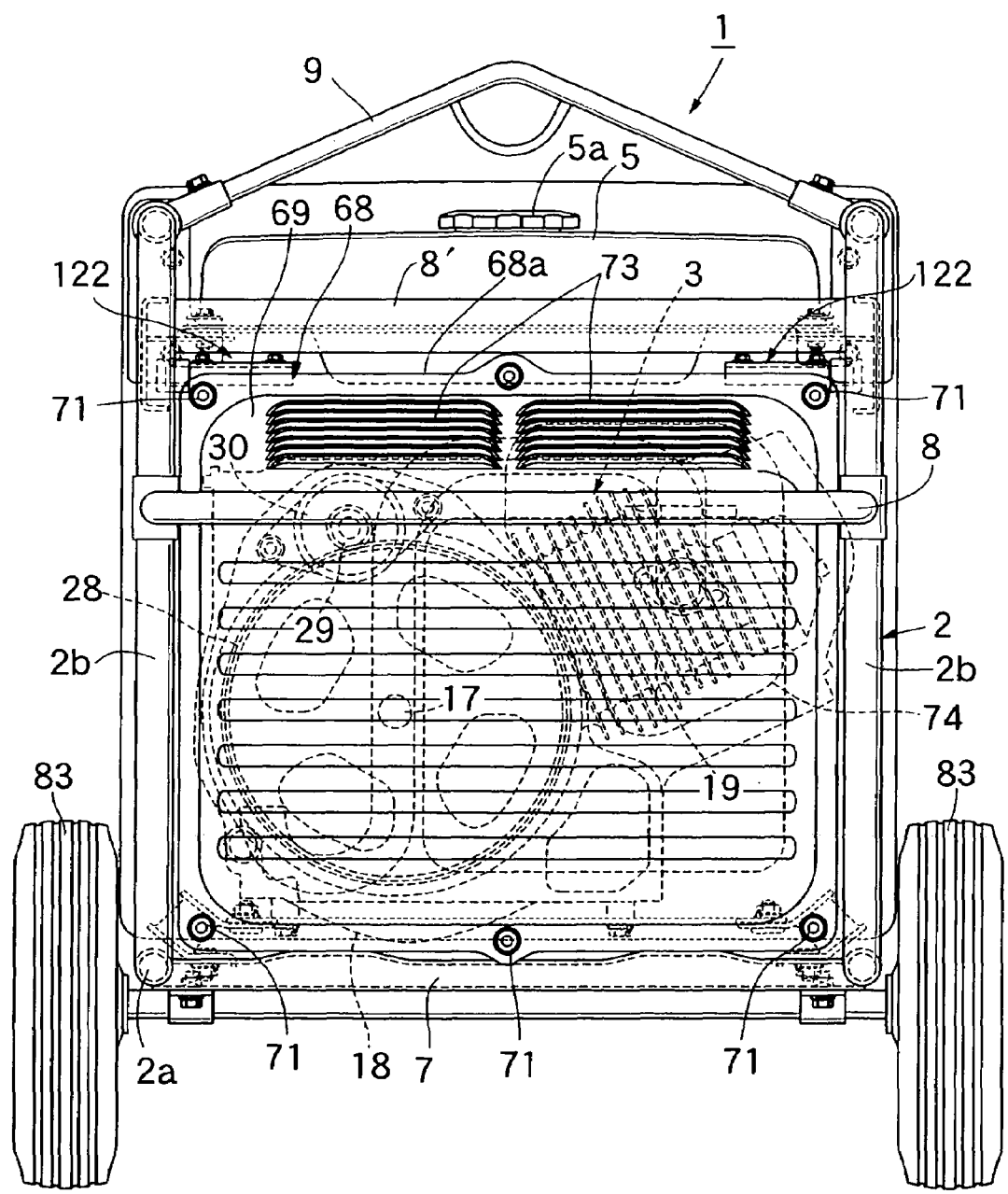
FIG. 6 is a rear view of the engine-driven generator (Embodiment 1).
Figure 7:
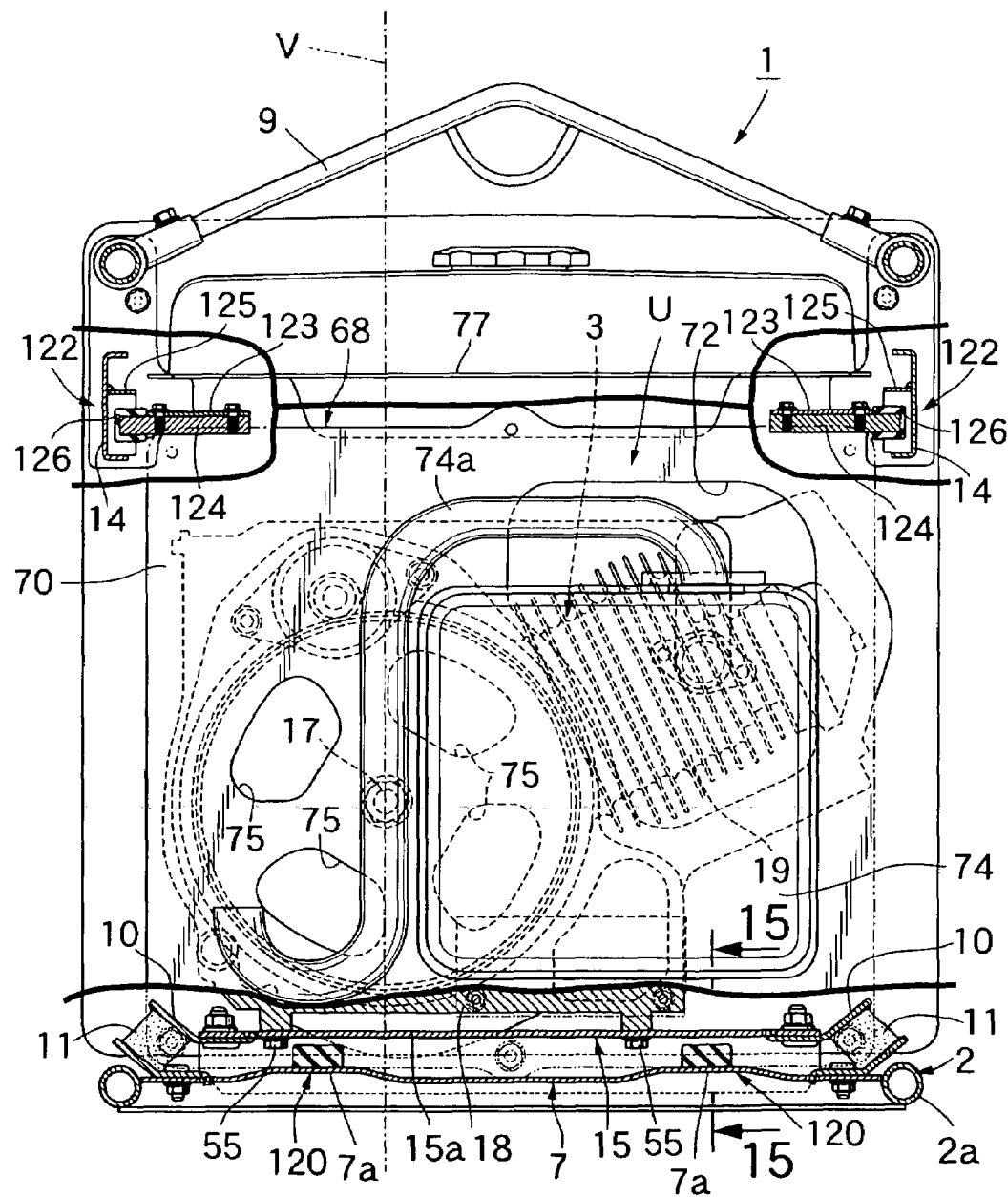
FIG. 7 is a rear view of the engine-driven generator, showing an exhaust box, part thereof being cut away (Embodiment 1).
Figure 8:
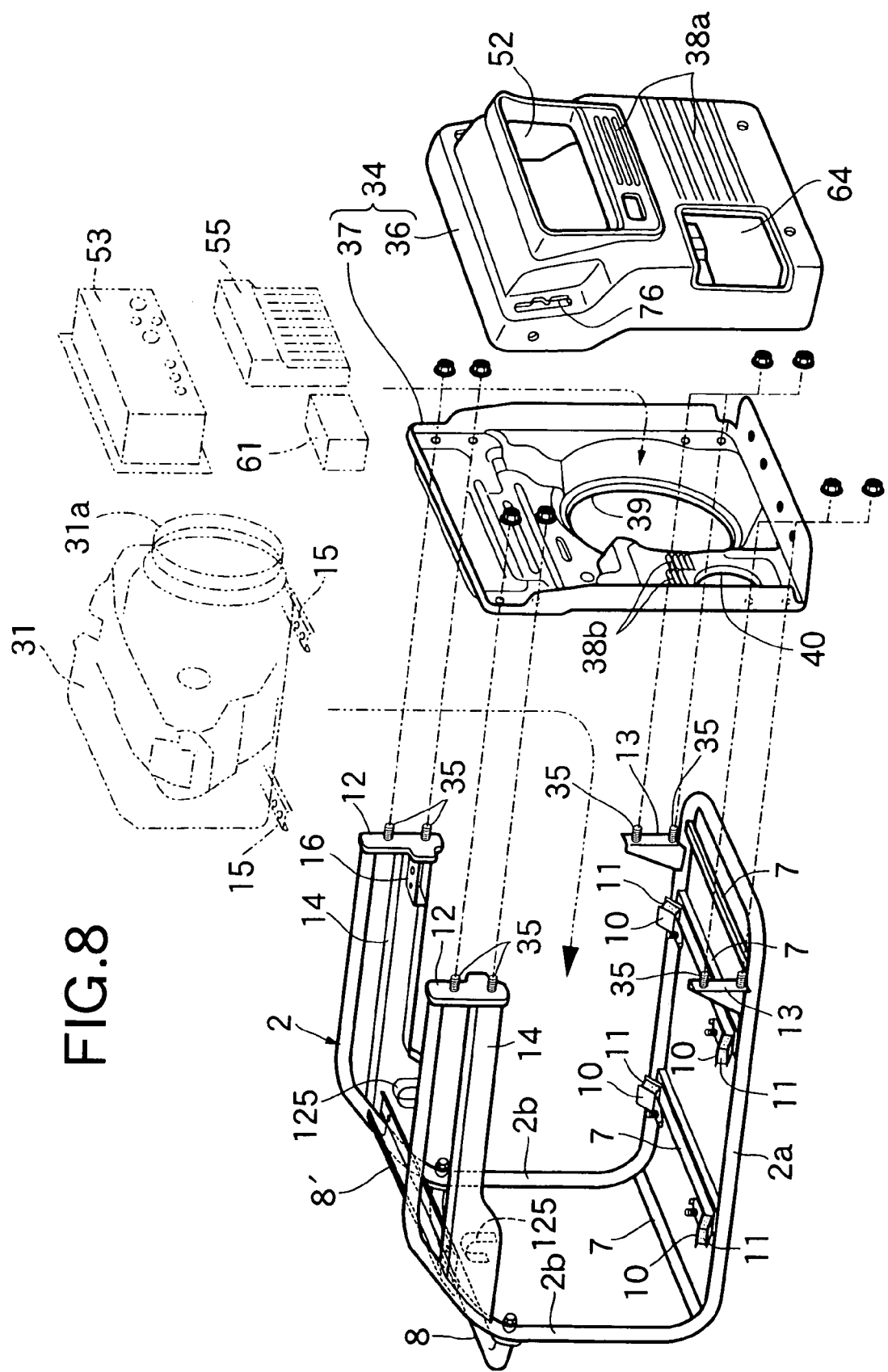
FIG. 8 is an exploded perspective view of part of the engine-driven generator (Embodiment 1).

In FIG. 6 to FIG. 8, among the lower cross members 7, 7, two of the cross members 7, 7 are equipped, via elastic support members 11, 11; 11, 11, with front and rear pairs of left and right support plates 10, 10; 10, 10. Furthermore, provided on the left and right side frames 2b, 2b are upper and lower pairs of left and right brackets 12, 12; 13, 13 disposed vertically on the front side of the frame 2, and connected to lower parts of the upper brackets 12, 12 are reinforcing stays 14, 14 extending forward from an upper end part of the vertical side section of the corresponding side frame 2b. Provided at front end parts of these reinforcing stays 14, 14 are a pair of left and right bracket pieces 16, 16.

Joined by bolts to the pairs of left and right support plates 10, 10; 10, 10 are connecting plates 15, 15 that provide a connection therebetween, and joined by a bolt 33 to these connecting plates 15, 15 is a bottom wall of the engine 3 or a bottom wall of a duct member 31, which will be described later, joined to the engine 3. In this way, the work unit U comprising the engine 3 and the generator 4 is resiliently supported on the frame 2.

As clearly shown in FIG. 7 in particular, the elastic support members 11, 11; 11, 11, which form pairs of left and right members, are disposed beneath a crankshaft 17 of the engine 3 on either side of a vertical plane V passing through the axis of the crankshaft 17 so that support faces of these elastic support members 11, 11; 11, 11 facing the lower cross members 7, 7 and the support plates 10, 10; 10, 10 are inclined so that the spacing between the support faces widens in going upward. The elastic support members 11, 11; 11, 11 therefore receive the downward load of the work unit U mainly as a compressive force and rotational vibration mainly as a shear force, but since the spring constant of the elastic support members 11, 11; 11, 11 is relatively high in the compression direction and relatively low in the shear direction, it is possible to enhance the rigidity with which the work unit U is supported and absorb the rotational vibration effectively.

Figure 15:
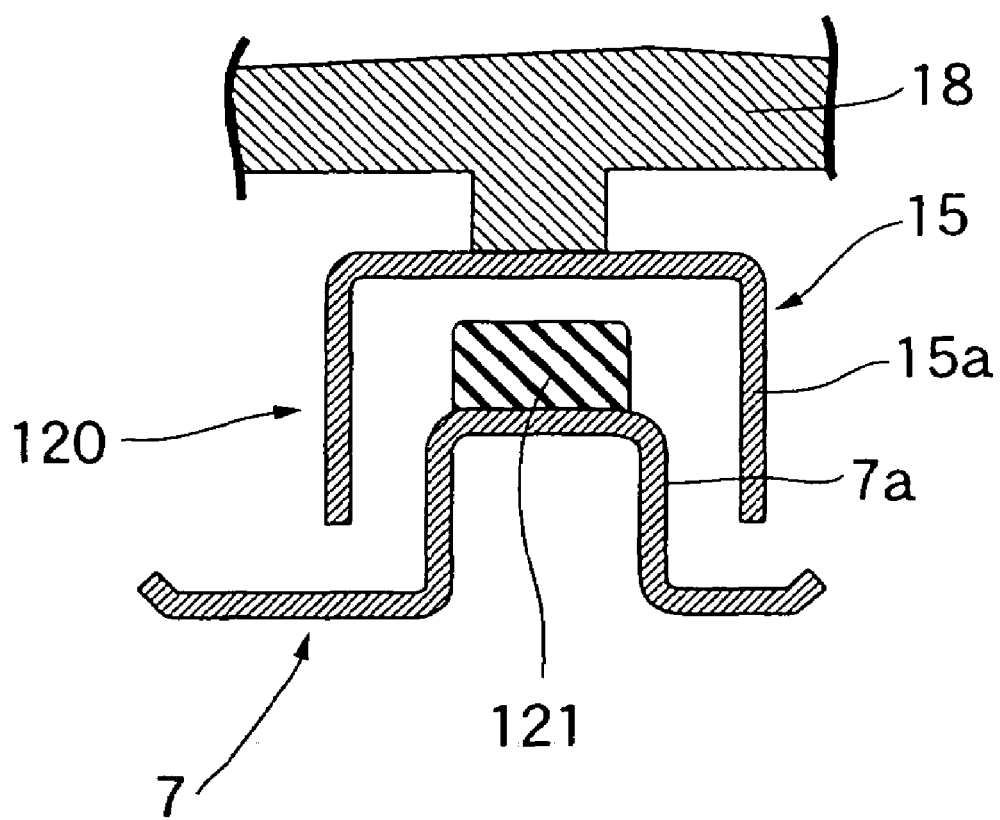
FIG. 15 is a sectional view along line 15-15 in FIG. 7 (Embodiment 1).

As shown in FIG. 7 and FIG. 15, two pairs of left and right lower restricting means 120, 120 are provided between the work unit U and the frame 2 between the left and right elastic support members 11, 11; 11, 11, the lower restricting means 120, 120 restricting movement of the work unit U along the axial direction of the crankshaft 17 to within a predetermined distance.

These lower restricting means 120, 120 are formed from an outer channel portion 15a formed on the connecting plate 15 so as to open downward and extend in the left-to-right direction, and an inner channel portion 7a formed on the lower cross member 7 and disposed so as to face two inner side faces of the outer channel portion 15a across a predetermined gap, and a cushioning member 121 made of rubber, etc. is mounted on an upper face of the inner channel portion 7a, the cushioning member 121 facing the roof of the outer channel portion 15a across a predetermined gap.

Figure 13:
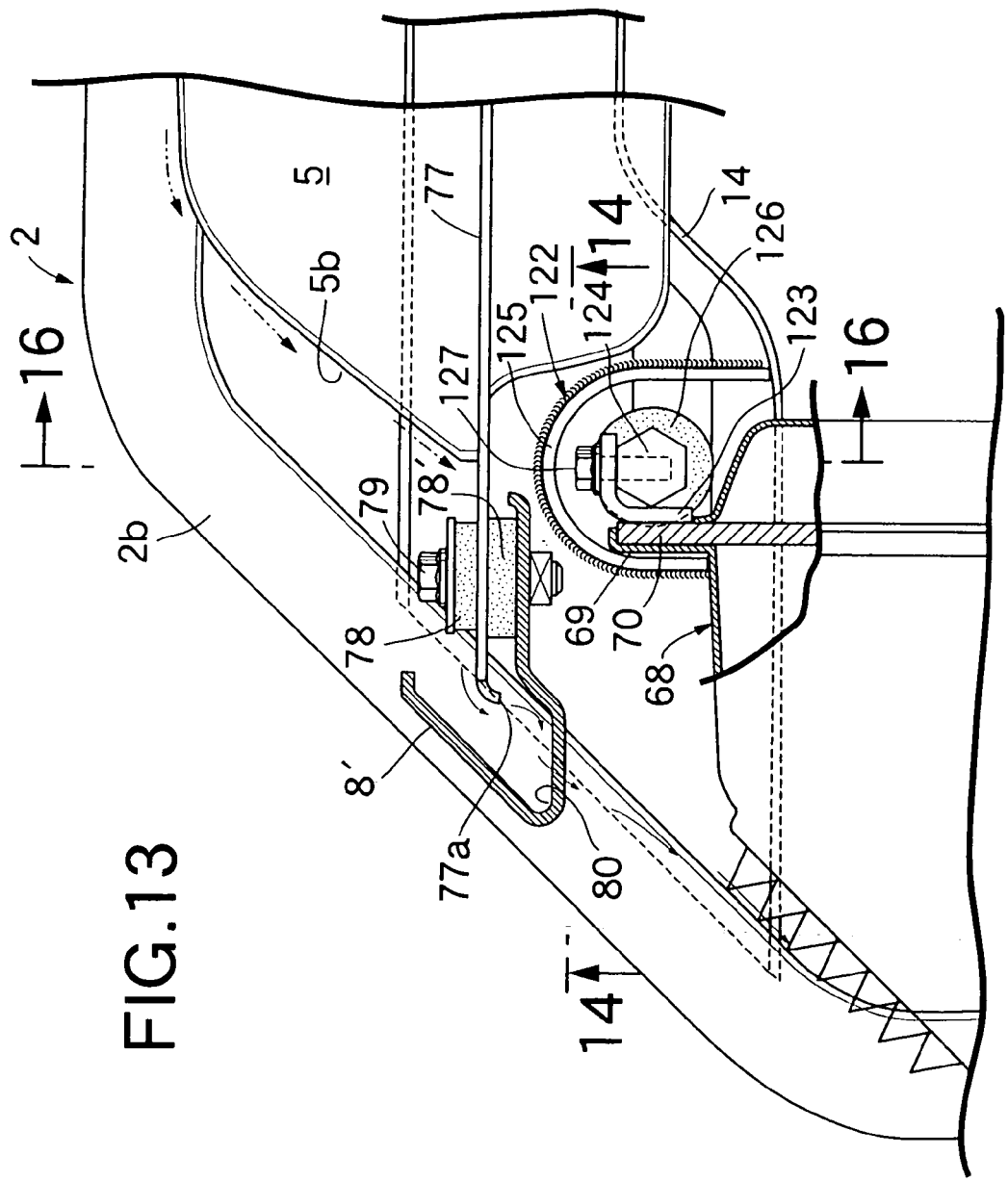
FIG. 13 is a sectional view along line 13-13 in FIG. 2 (Embodiment 1).
Figure 16:
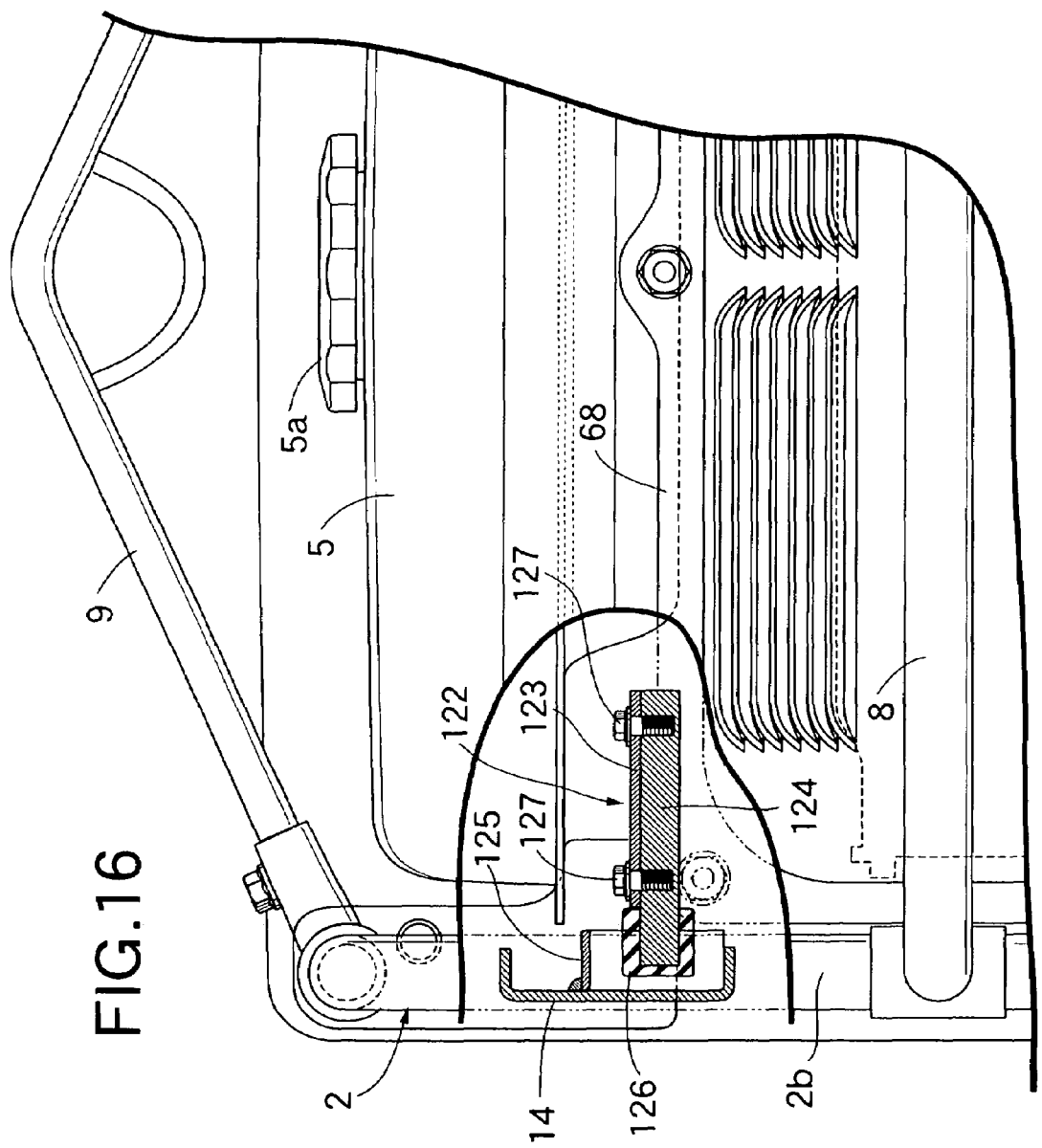
FIG. 16 is a sectional view along line 16-16 in FIG. 13 (Embodiment 1).

Furthermore, as shown in FIG. 7, FIG. 13, and FIG. 16, upper restricting means 122, 122 are provided between upper parts of the work unit U and the frame 2 on either side of the vertical plane V passing through the axis of the crankshaft 17, the upper restricting means 122, 122 restricting the amplitude of rotational swing of the work unit U around the crankshaft 17 to within a predetermined angle and, moreover, these upper restricting means 122, 122 are disposed so as to be a longer distance from the crankshaft 17 than the distance between the crankshaft 17 and corresponding one of the left and right elastic support members 11, 11.

To explain the arrangement of these upper restricting means 122, 122, a pair of bracket plates 123, 123 are fixedly provided by welding, etc. on opposite left and right ends of an upper end part of a highly rigid end plate 70 of an exhaust box 68 (the arrangement thereof will be described in detail later) joined integrally to the engine 3 of the work unit U, rod-shaped first stopper members 124, 124 are secured via bolts 127 to these bracket plates 123, 123, the first stopper members 124, 124 projecting laterally outward from the exhaust box 68, and cylindrical cushioning members 126, 126 are fitted onto projecting ends of these first stopper members 124, 124. A pair of left and right inverted U-shaped second stopper members 125, 125 are fixedly provided by welding, etc. on the left and right brackets 14, 14 of the upper part of the frame 2 so as to face an upper face and left and right side faces of the cushioning members 126, 126 across a predetermined gap.

Figure 9:
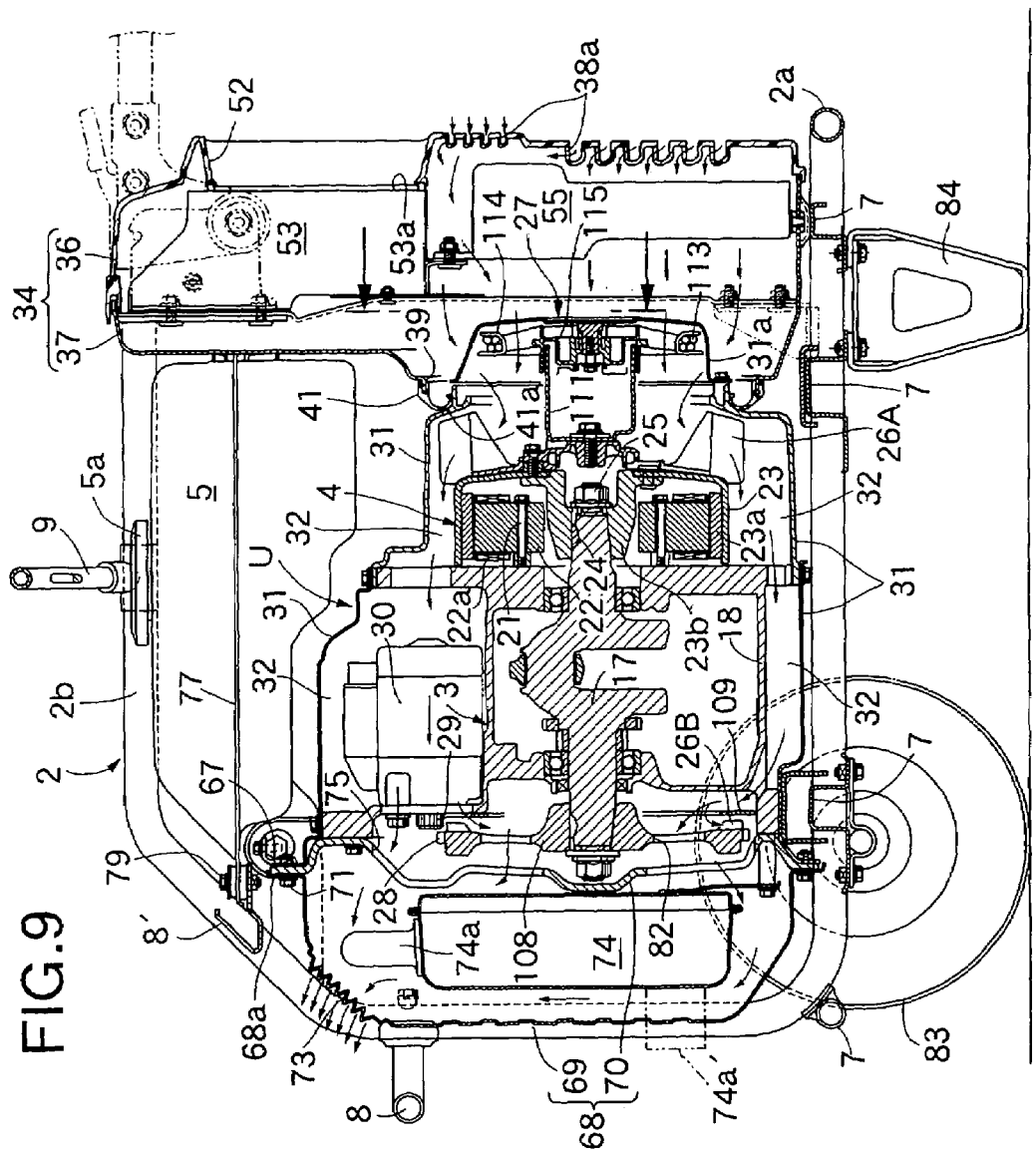
FIG. 9 is a sectional view along line 9-9 in FIG. 3 (Embodiment 1).
Figure 10:
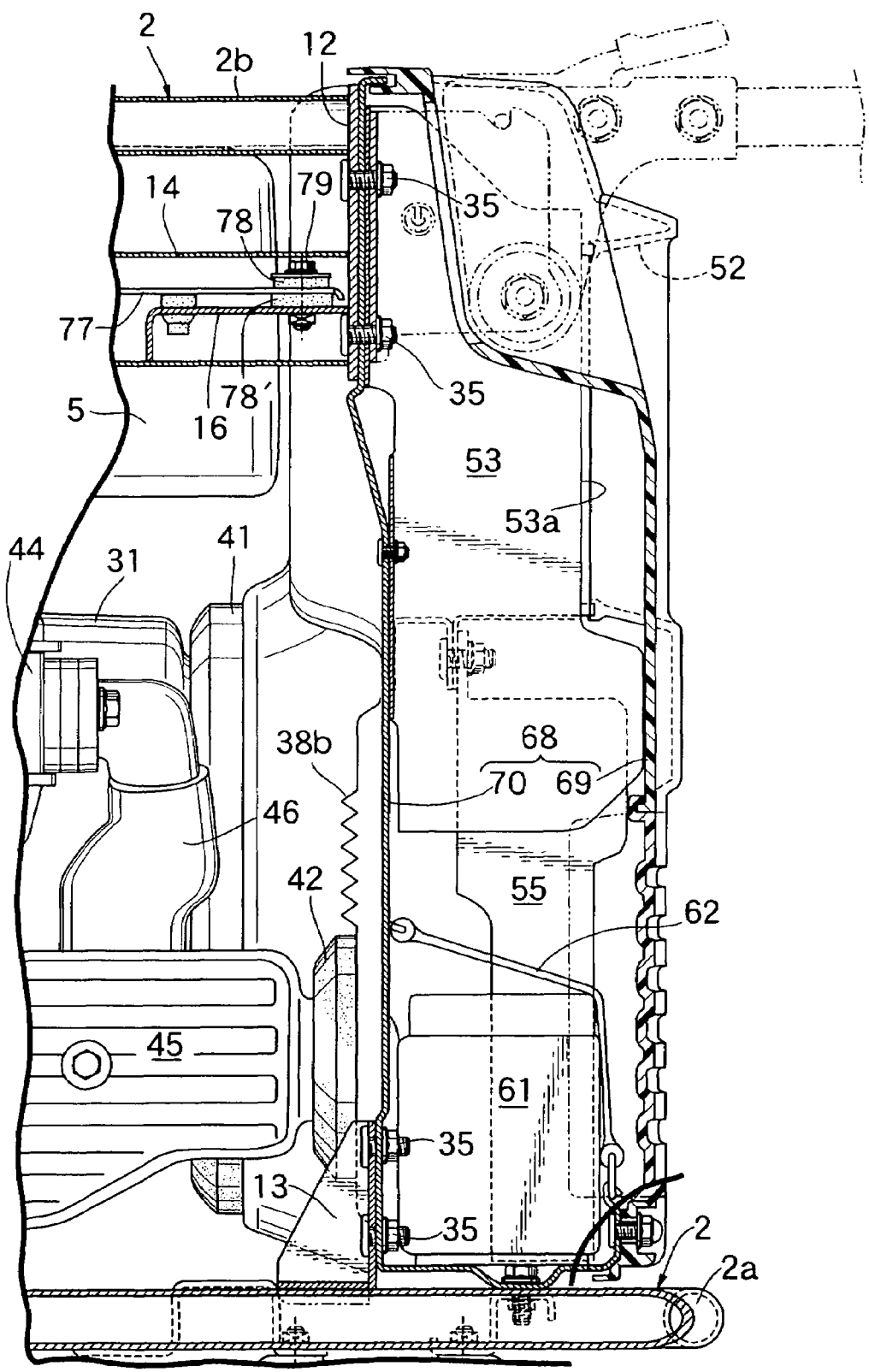
FIG. 10 is a sectional view along line 10-10 in FIG. 3 (Embodiment 1).
Figure 11:
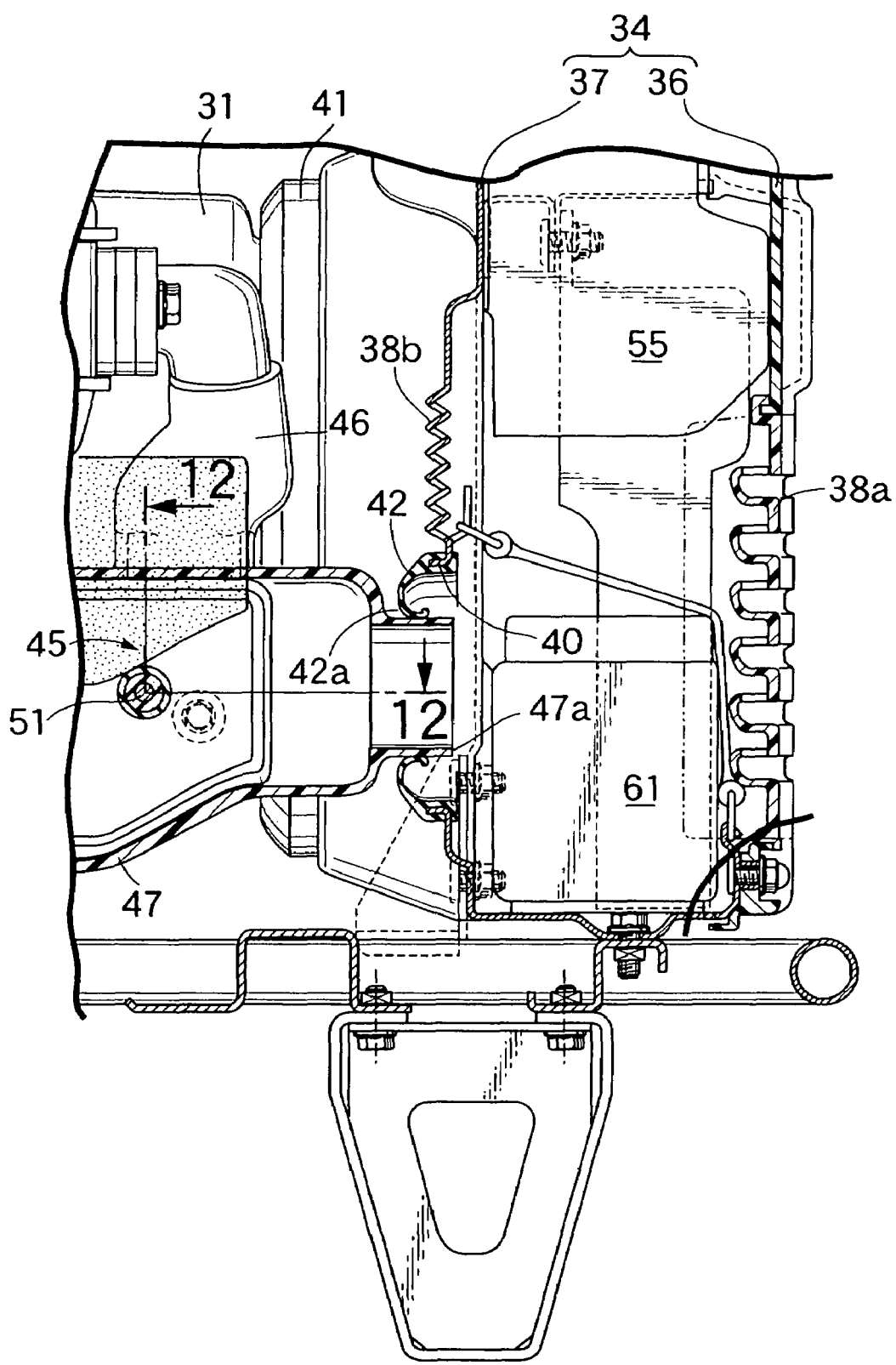
FIG. 11 is a sectional view along line 11-11 in FIG. 3 (Embodiment 1).

In FIG. 9 to FIG. 11, the duct member 31 is disposed on the outer periphery of the engine 3 and the generator 4, the duct member 31 defining a series of cooling air passages 32 between itself and the engine 3 and generator 4. In order to make production easy, the duct member 31 is segmented into a plurality of sections, and appropriate positions thereof are joined by bolting to an outer peripheral face of the engine 3.

As shown in FIG. 3 and FIG. 9, the engine 3 is of a 4-cycle type, the crankshaft 17 is disposed along the fore-and-aft direction of the engine-driven generator 1, a cylinder part 19 thereof projects obliquely upward to one side from a crankcase 18 housing and supporting the crankshaft 17, and an intake port and an exhaust port open on a front face and a rear face respectively of the cylinder part 19.

The generator 4 is formed from a stator 22 that is secured to a front end face of the crankcase 18 via a plurality of bolts 21 and includes a plurality of stator coils 22a, and an outer rotor 23 that is secured to a front end part of the crankshaft 17 running through a front end wall of the crankcase 18 and extending forward and that has a plurality of permanent magnets 23a arranged and fixedly provided on an inner peripheral face, that is, the generator is a so-called outer rotor multi-pole magnet generator. The outer rotor 23 includes a hub 23b surrounded by the stator 22, and this hub 23b is taper-fitted onto an end part of the crankshaft 17 and secured to the end part of the crankshaft 17 via a key 24 and a nut 25. In this way, the outer rotor 23 is cantilever-supported on the crankshaft 17.

Mounted on an outer end face of the outer rotor 23 are a centrifugal type first cooling fan 26A having a diameter that is larger than that of the outer rotor 23 and corresponds to the inner diameter of the duct member 31, and a recoil type starter 27 projecting forward of the first cooling fan 26A. The first cooling fan 26A is disposed at the front end of the cooling air passage 32 and by rotating makes cooling air flow from the front end side to the rear end side in the cooling air passage 32.

As shown in FIG. 6 and FIG. 9, a flywheel 108 is joined via a key to a rear end part, projecting outward from the crankcase 18, of the crankshaft 17. A starter gear 28 is formed on the outer periphery of the flywheel 108, and a starter motor 30 is mounted on an upper part of the crankcase 18, the starter motor 30 having on an output shaft a pinion 29 that can be meshed with the starter gear 28. This starter motor 30 is arranged so that, when operated, a pinion shift mechanism (not illustrated) therewithin is operated so as to drive the starter gear 28 while shifting the pinion 29 to a position where it is meshed with the starter gear 28, crank the crankshaft 17, and start the engine 3. A sufficient ventilation gap is provided between the starter gear 28 and an inner wall of the cooling air passage 32.

In this way, since the rotor 23 of the outer rotor type magnetic generator and the starter gear 28 are disposed on the front end part and the rear end part respectively of the crankshaft 17 of the engine 3, it is possible for the crankshaft 17, which has a long span, to absorb a starting impact of the starter motor 30 when the starter gear 28 is driven by the starter motor 30, and it is therefore possible to prevent the starting impact from being transmitted to the rotor 23, which is equipped with a magnet, without employing special cushioning means and irrespective of the presence or absence of the recoil type starter 27, thus simplifying the arrangement of the engine-driven generator 1 and making it compact. Moreover, since the starter gear 28 is formed on an outer peripheral part of the flywheel 108, which has a relatively large diameter, it is possible to make the diameter of the starter gear 28 sufficiently large, thus easily ensuring that there is a large starting reduction ratio.

Furthermore, a centrifugal type second cooling fan 26B is formed on a side face, facing the crankcase 18 side, of the outer peripheral part of the flywheel 108, and this second cooling fan 26B is therefore disposed at the rear end part of the cooling air passage 32. An annular air guide plate 109 is attached to an inner wall of the cooling air passage 32 so as to be disposed between the second cooling fan 26B and the crankcase 18. Moreover, a plurality of vents 82 are provided in the flywheel 108 on the inner peripheral side of the second cooling fan 26B.

In the cooling air passage 32, cooling air that is fed by the first cooling fan 26A is guided by the air guide plate 109 in two directions, that is, to the vent 82 side of the flywheel 108 and to the second cooling fan 26B side, and the cooling air that has been guided to the second cooling fan 26B side is further accelerated radially outward by the second cooling fan 26B and thus fed to an exit side of the cooling air passage 32 through the outer periphery of the starter gear 28.

In FIG. 1 to 5 and FIG. 8 to FIG. 11, disposed in a front part of the frame 2 is a rectangular intake box 34 for shaping the contours of a front face of the engine-driven generator 1 when viewed from the front. This intake box 34 is formed from a synthetic resin box main body 36 having an open rear face, and an end plate 37 made of a steel plate joined to the box main body 36 so as to close the open rear face. The end plate 37 is detachably secured via a plurality of bolts 35 to the brackets 12 and 13 as a reinforcing member for the frame 2, and the box main body 36 is detachably joined by bolting to the end plate 37.

As hereinbefore described, since the frame 2 is formed by making, using one steel pipe, the U-shaped base frame 2a and the pair of left and right side frames 2b, 2b sharing the left and right side sections of the base frame 2a to form a U-shape and by joining the two side frames 2b, 2b via the plurality of cross members 7, 8, and 8', the structure of the frame 2 is extremely simple and, moreover, since the frame 2 is reinforced by the intake box 34 detachably connected to its open front end part, the weight of the frame 2 can be reduced.

Dismantling the intake box 34 from the frame 2 enables the engine 3 and the generator 4 to be detached through the opened front side of the frame 2, thus making the maintenance thereof easy.

A first intake louver 38a is provided on the front face of the box main body 36; moreover, the end plate 37 is provided with a second intake louver 38b, a large diameter first connection opening 39 adjacent to the front end of the duct member 31, and a small diameter second connection opening 40, the peripheral edge of the first connection opening 39 is equipped with an annular first seal 41 made of an elastic material such as rubber, and a highly flexible annular seal lip 41a of the first seal 41 is fitted in an airtight manner around the outer periphery of the duct member 31. This first seal 41 links the intake box 34 and the duct member 31 while allowing relative displacement between the duct member 31 and the intake box 34 by virtue of elastic deformation of the seal lip 41a. A front end part of the duct member 31 is formed from a starter cover 31a, which will be described later, so as to project into the interior of the intake box 34, and an end wall and a peripheral wall of the starter cover 31a are provided with a large number of vents (not shown). The intake box 34 has a cross-sectional area that is larger than the total aperture area of the vents of the starter cover 31a, thus forming a muffler expansion chamber.

In FIG. 9, the recoil type starter 27 includes a cup-shaped driven member 111, the starter cover 31a, which is bowl-shaped, a rope pulley 114, and a one-way clutch 115, the driven member 111 being secured to the outer end face of the outer rotor 23, the starter cover 31a being joined to the front end of the duct member 31 so as to cover it, the rope pulley 114 being axially and rotatably supported on an inner wall of the starter cover 31a and having a starter rope 113 wound therearound, the one-way clutch 115 being provided between the rope pulley 114 and the driven member 111 and only providing a connection between the rope pulley 114 and the driven member 111 when the rope pulley 114 is rotated forward by being pulled by the starter rope 113, and the rope pulley 114 being urged in a backward direction by a return spring (not illustrated). A large number of vents are formed in the rope pulley 114 so that the rope pulley 114 does not interfere with the flow of cooling air within the duct member 31.

In FIG. 1 and FIG. 10 to FIG. 12, a carburetor 44 is mounted on a front face of the cylinder part 19 of the engine 3. This carburetor 44 runs through a side wall of the duct member 31 and is exposed outside the duct member 31, and an air cleaner 45 similarly disposed outside the duct member 31 is connected to an intake passage entrance of the carburetor 44 via an elastic communicating tube 46 made of an elastic material such as rubber. Furthermore, a high tension cord 43 connected to a spark plug of the engine 3 runs through the side wall of the duct member 31 and is taken outside.

As shown in FIG. 1, the air cleaner 45 has a substantially rectangular shape that is long in the axial direction of the crankshaft 17 of the engine 3 when viewed from the side, and is disposed so that at least part of the air cleaner 45 is beneath the cylinder part 19, which is inclined slightly upward on one side of the crankcase 18. By so doing, it becomes possible to arrange the relatively large capacity air cleaner 45 while lowering the center of gravity of the engine-driven generator 1.

Figure 12:
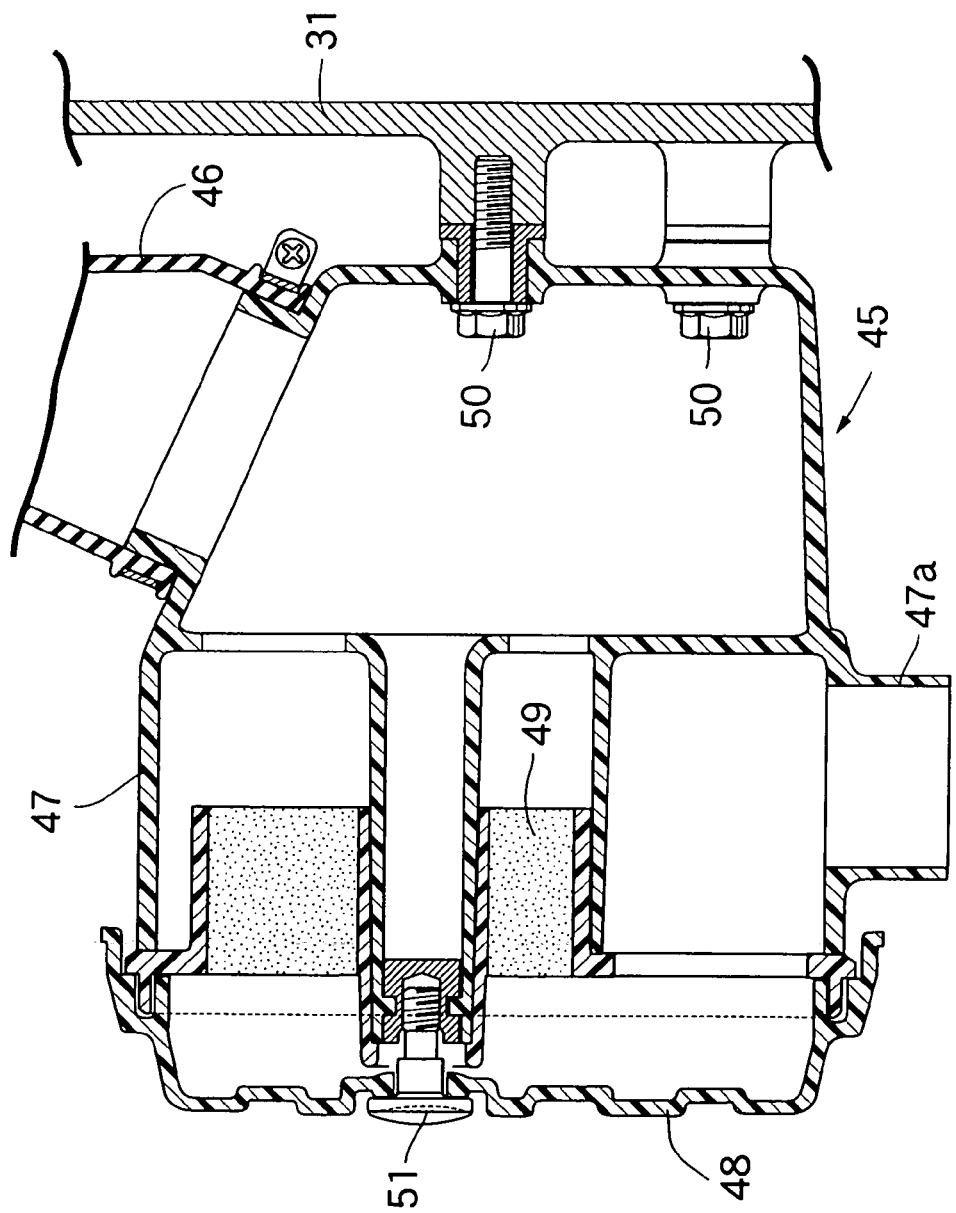
FIG. 12 is a sectional view along line 12-12 in FIG. 11 (Embodiment 1).

As clearly shown in FIG. 11 and FIG. 12, this air cleaner 45 is formed from a cleaner case 47, a case cover 48, and a cleaner element 49, the cleaner case 47 being secured by a bolt 50 to an outer face of the duct member 31 and having an open outer side face, the case cover 48 being joined to the cleaner case 47 by a bolt 51 so as to close the open face of the cleaner case 47, and the cleaner element 49 being held between the cleaner case 47 and the case cover 48. The cleaner case 47 has an integral air inlet pipe 47a communicating with the uncleaned side of the cleaner element 49.

The peripheral edge of the second connection opening 40 is equipped with an annular second seal 42 made of an elastic material such as rubber, and a highly flexible annular seal lip 42a of the second seal 42 is fitted around the outer periphery of the air inlet pipe 47a of the air cleaner 45. This second seal 42 links the intake box 34 and the air cleaner 45 while allowing relative displacement between the duct member 31 resiliently supported on the frame 2 via the engine 3 and the intake box 34 fixedly supported on the frame 2 by virtue of elastic deformation of the seal lip 42a.

Figure 5:
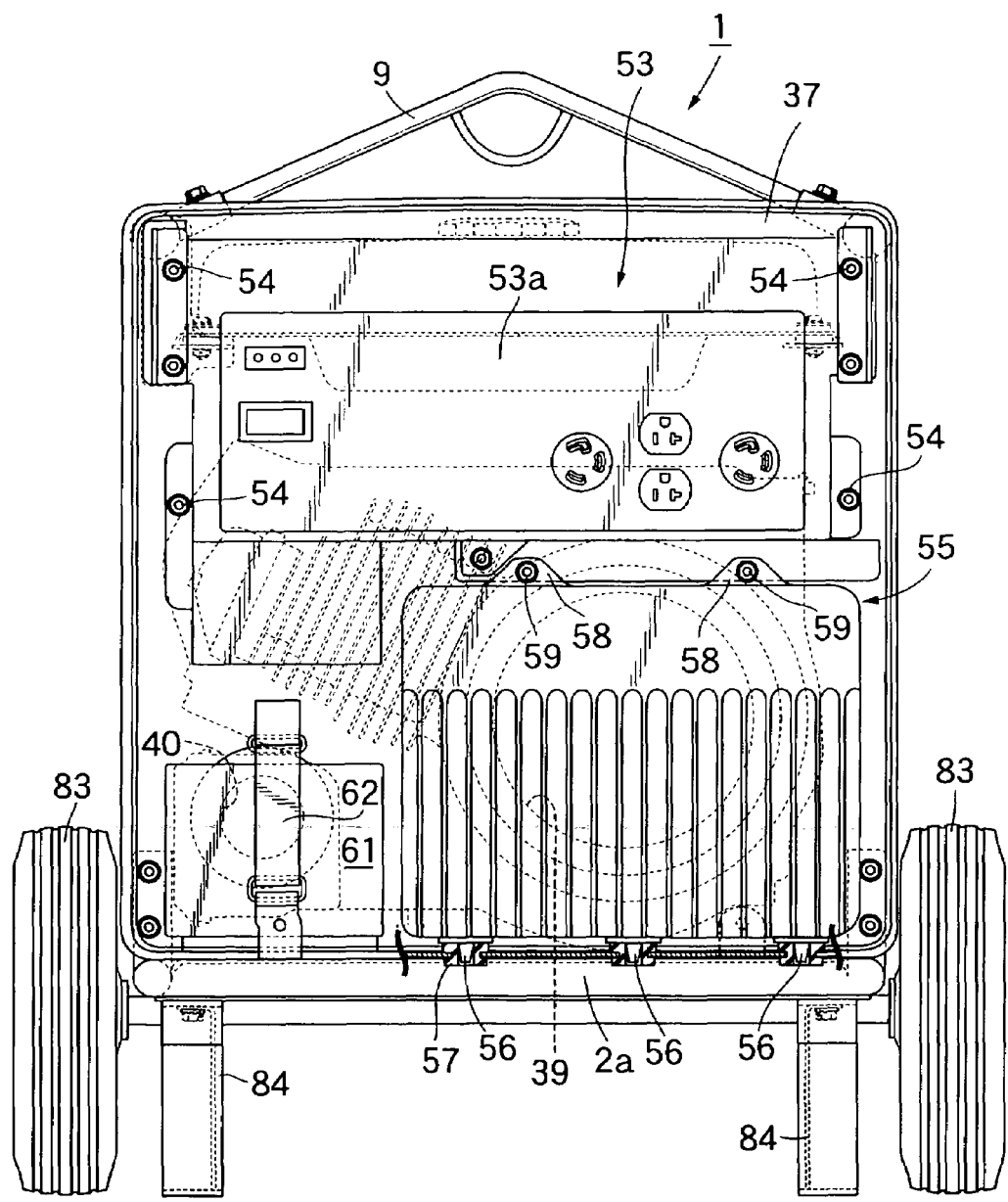
FIG. 5 is a front view of the engine-driven generator in a state in which a box main body of an intake box is detached (Embodiment 1).

In FIG. 3, FIG. 5 and FIG. 9, an access window 52 is provided on an upper part of a front face of the intake box 34, and an operation panel 53a of a control unit 53 for the engine 3 and the generator 4, which is disposed above the first connection opening 39 within the intake box 34, faces the access window 52. The control panel 53a is secured to an inner face of a rear wall of the intake box 34 via a bolt 54.

Within the intake box 34, the control unit 53 and an inverter 55 are disposed between the first intake louver 38a and the first connection opening 39, and a battery 61 is disposed between the first intake louver 38a and the second connection opening 40. In particular, the front end part of the duct member 31, which is disposed so as to project from the first connection opening 39 into the intake box 34, that is, the starter cover 31a, is disposed in proximity to a back face of the inverter 55.

The inverter 55 (see FIG. 5 in particular) is mounted on the intake box 34 by supporting a plurality of support shafts 56 projectingly provided on a lower end face of the inverter 55 on a base wall of the intake box 34 via grommets 57, and joining a plurality of ear pieces 58 at the upper end of the inverter 55 to the end plate 37 of the intake box 34 via bolts 59. In this arrangement, a sufficient ventilation gap is provided around the inverter 55 so as not to prevent air from flowing from the first and second intake louvers 38a and 38b to the first and second connection openings 39 and 40.

The battery 61 is retained on the end plate 37 by a rubber band 62. In this arrangement, a sufficient ventilation gap is provided around the battery 61 so as not to prevent air from flowing from the first and second intake louvers 38a and 38b to the second connection opening 40. For inspection of the battery 61, an inspection window 64 (see FIG. 8) that can be closed by a lid 63 is provided on a front wall of the intake box 34.

As clearly shown in FIG. 9, a mounting flange 67 is formed at the rear end of the duct member 31, and the exhaust box 68 is mounted on the mounting flange 67. The exhaust box 68 is formed from a box main body 69 and an end plate 70, the box main body 69 having an exhaust louver 73 in an upper part of its rear face and having an open front face, the end plate 70 being joined to a flange part 68a of the box main body 69 so as to close the open face thereof, and the end plate 70 and the flange part 68a being secured to the mounting flange 67 via a plurality of bolts 71. Large and small through holes 72 and 75 (see FIG. 7) are bored in the end plate 70 of the exhaust box 68, and the rear end of the duct member 31 communicates with the interior of the exhaust box 68 via these through holes 72 and 75. This exhaust box 68 has a cross-sectional area that is sufficiently larger than the aperture area of the through holes 72 and 75, thus forming a muffler expansion chamber.

This exhaust box 68 houses an exhaust muffler 74 and an outlet pipe 74a thereof, the exhaust muffler 74 being mounted on a rear face of the cylinder part 19 of the engine 3, and the end of the outlet pipe 74a opens at a long distance from the exhaust louver 73 of the exhaust box 68. A sufficient ventilation gap is provided around the exhaust muffler 74 so as to allow cooling air to flow from each of the through holes 72 and 75 to the exhaust louver 73.

As shown in FIG. 1, FIG. 7, FIG. 9, FIG. 13, and FIG. 14, the fuel tank 5, which includes a fuel filler hole cap 5a on an upper wall, is disposed above the duct member 31 covering the engine 3 and the generator 4. This fuel tank 5 has a substantially square shape when viewed from above and covers the whole length of an upper face of the duct member 31, and four corners of a mounting flange 77 projectingly provided on the outer periphery of the fuel tank 5 are detachably mounted, together with elastic members 78 and 78' disposed above and beneath the corners, on the upper cross member 8' and the bracket pieces 16, 16 of the frame 2 via bolts 79. In this way, the fuel tank 5 is resiliently supported on the frame 2.

Figure 14:
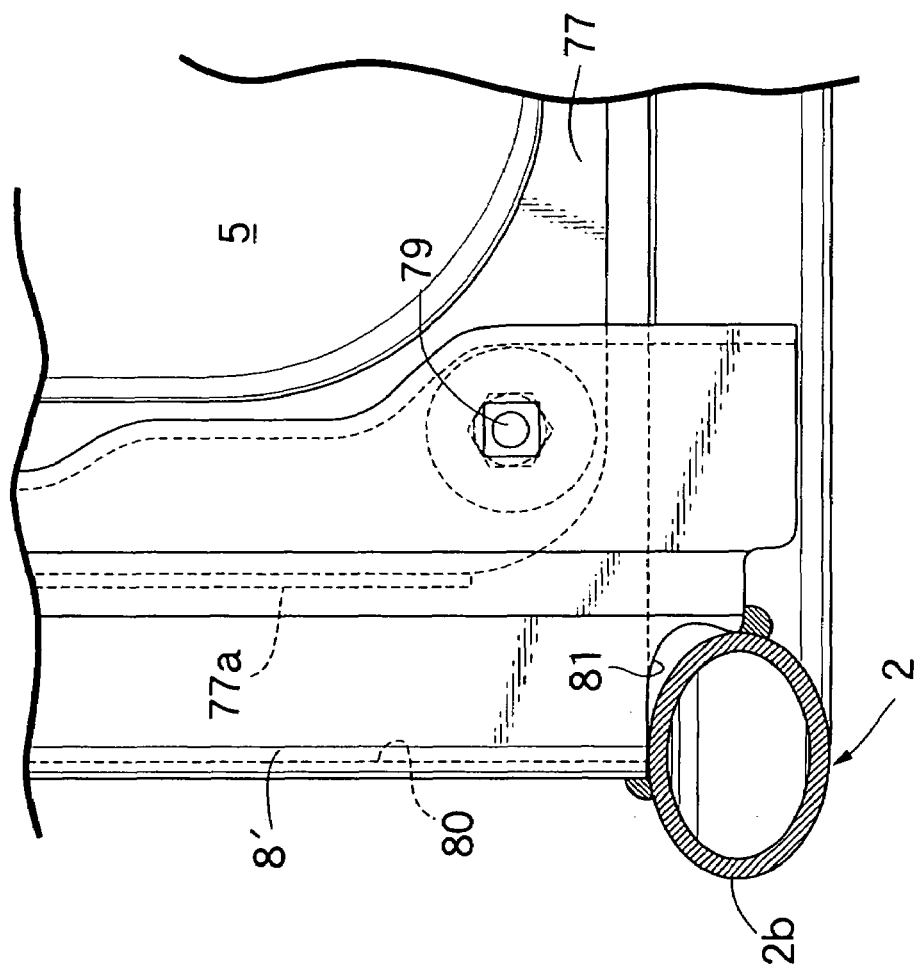
FIG. 14 is a sectional view along line 14-14 in FIG. 13 (Embodiment 1).

In FIG. 13 and FIG. 14 in particular, a gutter 80 is formed on the upper cross member 8' of the frame 2 supporting a rear end part of the mounting flange 77 of the fuel tank 5, a downwardly bent edge 77a of the mounting flange 77 facing the gutter 80, and opposite ends of the gutter 80 communicating with outer peripheral faces of the vertical side sections of the left and right side frames 2b, 2b via an outflow hole 81. The outflow hole 81 is formed as a cutout in a part of the cross member 8' where it is welded to the left and right side frames 2b, 2b. Furthermore, formed on an upper face of the fuel tank 5 is an inclined face 5b that slopes down toward the gutter 80 and extends to the mounting flange 77.

When filling the fuel tank 5 with fuel, even if fuel overflowing onto the upper face of the fuel tank 5 via the fuel filler hole flows rearward, the fuel flows down the inclined face 5b, reaches the mounting flange 77, is guided by the downwardly bent edge 77a of the flange 77, reliably flows into the gutter 80, flows along the gutter 80, flows down from either one of the left and right outflow holes 81 along the outer peripheral face of the vertical side section of the corresponding one of the left and right side frames 2b, 2b, and drops outside the machine.

Therefore, as in the illustrated example, even when the engine 3, the generator 4, or auxiliary equipment therefor, such as the exhaust box 68, is disposed beneath the gutter 80, since the overflowing fuel will not contaminate it, the degree of freedom in the layout can be increased outstandingly.

Furthermore, since the gutter 80 is formed by utilizing the cross member 8', which is a reinforcing member of the frame 2, the structure can be simplified and, moreover, since the outflow hole 81 is formed as a cutout at opposite ends of the cross member 8', any degradation in the strength of the frame 2 can be avoided.

The duct member 31, the exhaust box 68, and the fuel tank 5 are disposed within the open type frame 2.

As shown in FIG. 1, FIG. 3, FIG. 4 and FIG. 9, a pair of left and right wheels 83, 83 are axially supported on the base frame 2a of the frame 2 on the rear side, that is, on the exhaust box 68 side, and a pair of left and right grounding legs 84, 84 are fixedly provided on the base frame 2a of the frame 2 on the front side, that is, the intake box 34 side. Furthermore, a moving handle 86 is axially supported on the front end of the upper part of the frame 2, and is arranged so that when not used it can be pivoted to a lower storage position (see FIG. 4).

The operation of this embodiment is now explained.

When the engine 3 is running, electricity is generated by driving the generator 4 by means of the rotating crankshaft 17, and the output is controlled by the inverter 55 and the control unit 53 and then taken out via a receptacle on the operation panel 53a.

Furthermore, the first cooling fan 26A, which is rotated by the crankshaft 17, takes outside air as cooling air into the intake box 34 through the first and second intake louvers 38a and 38b, and makes it flow through the cooling air passage 32 within the duct member 31 from the front end side to the rear end side. When the cooling air reaches the rear end part of the cooling air passage 32, it is now accelerated by the second cooling fan 26B, fed to the exhaust box 68, and discharged to the outside via the exhaust louver 73.

In this way, since the first cooling fan 26A and the second cooling fan 26B disposed on the front end part and the rear end respectively of the cooling air passage 32 cooperatively generate a large amount of cooling air flow, it is possible to cool the engine 3 and the generator 4 effectively with the cooling air. In particular, since the second cooling fan 26B is formed on the side face of the outer peripheral part of the flywheel 108, the diameter can be made sufficiently large, and it is possible to generate a large amount of cooling air around the engine 3, thus cooling the engine effectively. Moreover, since the second cooling fan 26B is integrated with the flywheel 108 and the starter gear 28, it is possible to suppress any increase in the number of components and contribute to a simplification of the arrangement.

Due to such a flow of cooling air, the control unit 53 and the inverter 55 are cooled within the intake box 34, and the exhaust muffler 74 is cooled within the exhaust box 68.

In particular, since the front end part of the duct member 31, that is, the starter cover 31a having the vents, is disposed in proximity to the back face of the inverter 55 within the intake box 34, air around the inverter 55 is taken into the duct member 31 effectively, and the inverter 55, which easily attains a relatively high temperature, can be cooled effectively.

Furthermore, exhaust gas discharged from the outlet pipe 74a of the exhaust muffler 74 is mixed with the cooling air within the exhaust box 68, thus lowering the exhaust temperature, and at the same time exhaust noise can be reduced effectively.

Moreover, the first cooling fan 26A, which has a large diameter corresponding to the inner diameter of the duct member 31, can be simply mounted by utilizing the large outer end face of the outer rotor 23, which is cantilever-supported on the crankshaft 17, and the effect of cooling the engine 3 and the generator 4 can be enhanced.

While the engine 3 and the generator 4 are running, the operating noise generated by these and the first and second cooling fans 26A and 26B is blocked by the duct member 31. That is, the duct member 31 plays a role as a soundproofing wall for the engine 3, the generator 4, and the first and second cooling fans 26A and 26B. Furthermore, even if the operating noise is transmitted from the front end and the rear end of the duct member 31 to the intake box 34 and the exhaust box 68, by virtue of the expansion muffler effect of the intake box 34 and the exhaust box 68 the operating noise can be muffled effectively, and it is possible to prevent as much as possible the operating noise from leaking outside. In particular, with regard to the intake box 34, since the control unit 53 and the inverter 55 are disposed between the first connection opening 39 and the first intake louver 38a, the control unit 53 and the inverter 55 become soundproofing partitions between the first connection opening 39 and the first intake louver 38a, thus preventing the noise from leaking outside and thereby enhancing the muffling effect of the intake box 34. In this way, the quietness of the engine-driven generator 1 can be ensured.

Moreover, the fuel tank 5 covers the whole length of the upper face of the duct member 31, thus forming, in cooperation with the duct member 31, a double soundproofing wall for the engine 3 and the generator 4, and it is therefore possible to prevent effectively the operating noise of the engine 3 and the generator 4 from leaking upward, thus further enhancing the quietness of the engine-driven generator 1 by a simple structure.

Moreover, since the relatively large fuel tank 5 is mounted in the upper part of the left and right side frames 2b, 2b as described above, it is easy to mount and demount the fuel tank 5, and since it is detachable relative to the frame 2 in the same manner as the intake box 34, demounting the fuel tank 5 and the intake box 34 makes the upper face and the front face of the frame 2 open and enables the engine 3 and the generator 4 to be easily detached, thus enhancing the ease of maintenance.

Furthermore, during an intake stroke of the engine 3, since air within the intake box 34 is taken into the engine 3 via the air cleaner 45 and the carburetor 44, intake noise of the engine 3 can also be muffled effectively by the intake box 34. In particular, the battery 61 within the intake box 34 becomes a soundproofing partition between the second connection opening 40 and the first intake louver 38a, thus preventing the intake noise from leaking outside and thereby further enhancing the muffling effect of the intake box 34.

In this way, the operating noise of the engine 3, the generator 4, and the first and second cooling fans 26A and 26B, etc. can be reduced simply and reliably by the duct member 31 covering the engine 3 and the generator 4, and by the intake and exhaust boxes 34 and 68 connected to the front and rear ends of the duct member 31 and, moreover, since the duct member 31 and the intake and exhaust boxes 34 and 68 are disposed within the open type frame 2, compared with a conventional arrangement in which an entire engine-driven generator is covered by a soundproofing wall, the engine-driven generator 1 can be made compact and lightweight. Moreover, since the carburetor 44 and the air cleaner 45 are disposed outside the duct member 31, maintenance operations thereof can be carried out easily and quickly.

When such a work unit U is running, if this vibrates around the crankshaft 17, this vibration is absorbed by elastic deformation mainly in the shear direction of the elastic support members 11, 11; 11, 11, thus preventing the vibration from being transmitted to the frame 2 or greatly reducing it.

Furthermore, when the work unit U receives a large external force in the lateral direction while running or when being transported, even if the work unit U attempts to swing through a large angle with the elastic support members 11, 11; 11, 11 on one side as the fulcrum, since the left and right rod-shaped first stopper members 124, 124 alternately abut against the roofs of the left and right inverted U-shaped second stopper members 125 in the left and right upper restricting means 122, it is possible to suppress the swing of the work unit U to a fixed level, and it is therefore possible to avoid interference between the work unit U and the frame 2 while preventing excessive deformation of the elastic support members 11, 11.

In this case, since the left and right upper restricting means 122, 122 in particular are disposed above and sufficiently distant from the elastic support members 11, 11; 11, 11 on one side, which become the swing fulcrum for the work unit U, the load the upper restricting means 122, 122 receive becomes relatively small, thus improving the durability of the upper restricting means 122, 122 and making them small and lightweight.

Moreover, since the opposite side parts of the upper part of the exhaust box 68, on which the left and right upper first stopper members 124, 124 are mounted, are sufficiently distant from the crankshaft 17 in the work unit U, it is possible to easily provide a sufficiently long distance between the left and right upper restricting means 122, 122 and the crankshaft 17. Furthermore, since the opposite side parts of the upper part of the exhaust box, on which the left and right upper restricting means 122, 122 are provided, are relatively close to the frame 2, it is possible to easily arrange the upper restricting means 122, 122 in proximity to the frame 2.

Furthermore, since the upper restricting means 122, 122 disposed between the work unit U and the frame 2 directly restrict swinging of the upper part of the work unit U, it is possible to accurately restrict the swinging of the upper part of the work unit U, which is particularly susceptible to swinging, thus minimizing the gap between the work unit U and the upper part of the frame 2 and thereby contributing to making the engine-driven generator 1 compact.

Moreover, when the work unit U receives a large external force in the axial direction of the crankshaft 17, that is, the fore-and-aft direction, during transport, etc., even if the work unit U attempts to move by a large amount in the fore-and-aft direction, since in the upper restricting means 122, 122 the first stopper member 124, 124 abuts against the inner side faces of the second stopper member 125, 125, and in the lower restricting means 120, 120 the inner side face of the outer channel portion 15a of the connecting plate 15 abuts against the outer side face of the inner channel portion 7a of the lower cross member 7, it is possible to avoid interference between the work unit U and the frame 2 while reducing the impact load exerted on the elastic support members 11, 11 by suppressing deformation of the elastic support members 11, 11; 11, 11 and movement of the work unit U in the fore-and-aft direction to a low level.

Furthermore, in the lower restricting means 120, 120, since the cushioning member 121 is provided between the vertically opposing faces of the inner and outer channel portions 7a and 15a, when a large downward load is applied to the work unit U, the inner and outer channel portions 7a and 15a abut against each other via the cushioning member 121, thus suppressing the downward movement of the work unit U to a low level while moderating the external force exerted on the cross member 7.

On the other hand, since the duct member 31 and the air cleaner 45 are fixed to the engine 3, they vibrate together with the work unit U, but since the intake box 34 is fixed to the frame 2, when the engine 3 and the generator 4 are running, a relative displacement occurs between the duct member 31 and air cleaner 45 and the intake box 34 due to the vibration of the engine 3. However, since the first and second connection openings 39 and 40 of the intake box 34 are connected to the duct member 31 and the air cleaner 45 via the first and second seals 41 and 42, which are made of an elastic material, the relative displacement, accompanying the vibration, between the duct member 31 and air cleaner 45 and the intake box 34 is allowed by virtue of elastic deformation of the first and second seals 41 and 42, and it is therefore possible for cooling air to efficiently flow from the intake box 34 to the duct member 31 without leaking. Furthermore, when the work unit U swings or moves, resistance to the swing or movement of the work unit U is generated not only by the operation of the upper restricting means 122, 122 but also by the resilient force occurring in the first and second seals 41 and 42, thus enabling a large impact load to be sufficiently withstood.

The present invention is not limited to the above-mentioned embodiment, and can be modified in a variety of ways as long as the modifications do not depart from the spirit and scope thereof.

For example, the starter gear 28 may be formed in a ring shape and united with the outer periphery of the flywheel 108 by press fitting or welding.

Furthermore, the air cleaner 45 may also be fixedly supported on the frame 2 in the same manner as for the intake box 34, relative displacement between the carburetor 44 and the air cleaner 45 accompanying vibration of the engine 3 being absorbed by flexure of the elastic communicating tube 46 providing communication between the carburetor 44 and the air cleaner 45, and in this case the air inlet pipe 47a of the air cleaner 45 can be connected integrally to the intake box 34.

Furthermore, the outlet pipe of the exhaust muffler 74 may be opened to the outside by making it run through an outer wall of the exhaust box 68 as shown by the reference numeral 74a' in FIG. 9. In this case, only cooling air is discharged from the exhaust louver 73 of the exhaust box 68.

The invention claimed is:

1. An engine-driven work machine in which a work unit is formed by joining an engine and a work machine driven by a crankshaft of the engine, elastic support members are disposed between a lower part of the work unit and a frame having the work unit mounted thereon, the elastic support members being disposed beneath the crankshaft on either side of a vertical plane passing through the axis of the crankshaft, support faces of opposite elastic support members facing the frame and the work unit are inclined so as to widen from each other in going upward, and restricting means is provided between the work unit and the frame, the restricting means restricting the amplitude of swing of the work unit around the crankshaft to within a predetermined angle, and the restricting means is disposed between upper parts of the work unit and the frame as upper restricting means, wherein the upper restricting means is disposed on either side of the vertical plane passing through the axis of the crankshaft above the crankshaft, and the upper restricting means is arranged so as to also restrict movement of the work unit along the axial direction of the crankshaft to within a predetermined distance, and wherein an exhaust box housing an exhaust muffler of the engine is fixedly provided on one end part of the work unit, and the upper restricting means is provided between opposite side parts of an upper part of the exhaust box and the frame.

2. The engine-driven work machine according to claim 1, wherein a duct member having a cooling air passage defined on the outer periphery of the work unit is fixedly provided on the work unit, and an intake box, having an intake opening and fixed to the frame is connected to an upstream end part of the duct member via an elastic seal.

3. The engine-driven work machine according to one of claims 1 and 2, wherein lower restricting means is provided between the work unit and the frame between the two elastic support members, the lower restricting means restricting movement of the work unit along the axial direction of the crankshaft to within a predetermined distance.

4. The engine-driven work machine according to claim 3, wherein the lower restricting means is formed from a channel-shaped first stopper member fixedly provided on one of the frame and the work unit and extending in the lateral direction of the work unit, and a second stopper member fixedly provided on the other of the frame and the work unit, the second stopper member facing a roof and opposite inner side faces of the first stopper member across a predetermined gap, and a cushioning member being disposed between upper and lower opposing faces of the first and second stopper members.

5. The engine-driven work machine according to claim 1, wherein the upper restricting means is formed from a rod-shaped first stopper member fixedly provided on one of the frame and the work unit and extending in the lateral direction of the work unit, and an inverted U-shaped second stopper member fixedly provided on the other of the frame and the work unit, the second stopper member facing an upper face and opposite side faces of the first stopper member across a predetermined gap.

6. An engine-driven work machine in which a work unit is formed by joining an engine and a work machine driven by a crankshaft of the engine, elastic support members are disposed between a lower part of the work unit and a frame having the work unit mounted thereon, the elastic support members being disposed beneath the crankshaft on either side of a vertical plane passing through the axis of the crankshaft, support faces of opposite elastic support members facing the frame and the work unit are inclined so as to widen from each other in going upward, and restricting means is provided between the work unit and the frame, the restricting means restricting the amplitude of swing of the work unit around the crankshaft to within a predetermined angle, and the restricting means is disposed between upper parts of the work unit and the frame as upper restricting means, wherein the upper restricting means is disposed on either side of the vertical plane passing through the axis of the crankshaft above the crankshaft, and the upper restricting means is arranged so as to also restrict movement of the work unit along the axial direction of the crankshaft to within a predetermined distance, and wherein the upper restricting means is formed from a rod-shaped first stopper member fixedly provided on one of the frame and the work unit and extend in the lateral direction of the work unit, and an inverted U-shaped second stopper member fixedly provided on the other of the frame and the work unit, the second stopper member facing an upper face and opposite side faces of the first stopper member across a predetermined gap.

\* \* \* \* \*